No. 885,999. PATENTED APR. 28, 1908.
J. H. HOSEASON.
URETHRAL SYRINGE.
APPLICATION FILED MAR. 30, 1907.

WITNESSES
W. P. Burks
M. Petit

INVENTOR
James Henry Hoseason
Wm. Wallace White
ATTY

UNITED STATES PATENT OFFICE.

JAMES HENRY HOSEASON, OF MANCHESTER, ENGLAND.

URETHRAL SYRINGE.

No. 885,999.

Specification of Letters Patent.

Patented April 28, 1908.

Application filed March 30, 1907. Serial No. 365,513.

*To all whom it may concern:*

Be it known that I, JAMES HENRY HOSEASON, a subject of Great Britain, residing at 2 Bridge street, Manchester, in the county of Lancaster, England, have invented a new and useful Improved Urethral Syringe, of which the following is a specification.

My invention relates to an improved urethral syringe which is designed to flush out the urethral passage by means of liquid injected and forced outward by the action of the syringe.

In constructing my improved syringe I employ a tube connected to a collapsible rubber ball at one end and with a non-return valve at the other end. This tube is intended to be placed in the lotion or liquid to be injected. On the other side the rubber ball has connected to it one end of a soft rubber tube tapering to its extreme end which is closed near which any suitable number of channeled holes preferably two or more such holes are formed sloping from the interior of the tube outward and backward towards the collapsible ball.

Figure 1:
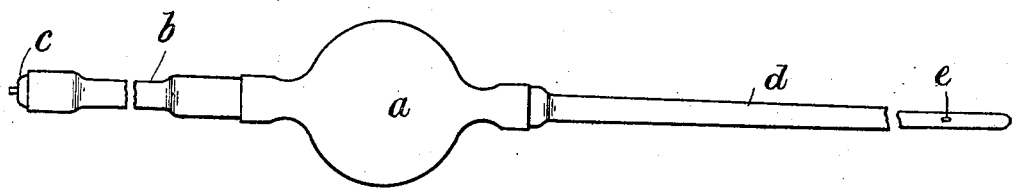
Figure 2:
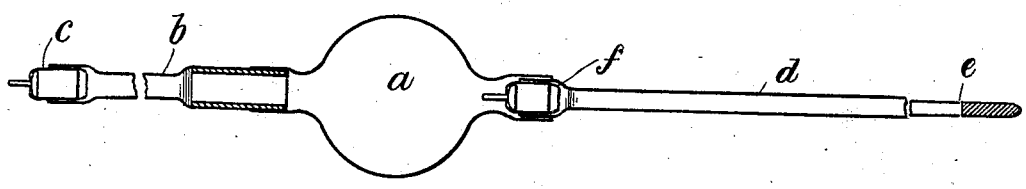
Figure 3:
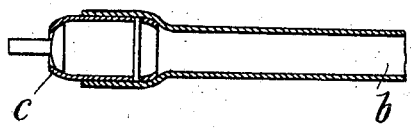
Figure 4:
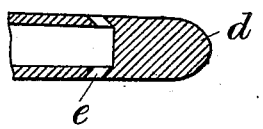

In the accompanying sheet of drawings—Figure 1 is an outside view of a urethral syringe made according to my invention. Fig. 2 is a similar view, in section, and Figs. 3 and 4 are enlarged views, in section, of parts of the syringe.

In the drawing.—$a$ designates the collapsible rubber ball; $b$ a tube; $c$ a non-return valve fitted at the end of the tube; $d$ a soft rubber tube connected on the other side of the rubber ball tapering to its extreme end which is closed, as shown in Fig. 4. The tube $d$ is provided with one, two or more channeled holes $e$ which slope or incline from the interior of the tube outward and backward towards the collapsible ball. At the end of the soft tube $d$, where it is connected to the rubber ball, a second non-return valve $f$ may, or may not, be fitted and this valve is similar to the valve $c$ and opens in the same direction.

In action, the soft rubber tube $d$ is inserted any required distance into the urethral passage usually until the closed end has passed the affected part. By then collapsing the ball $a$ liquid, previously drawn into the ball in the usual way, is forced continuously down the soft rubber tube and is expelled into the urethral passage thus flowing outwardly through the holes $e$ between the exterior of the rubber tube $d$ and the mucous surface of the passage over the affected part of the urethra. The soft rubber tube $d$ with a small solid end can be used in many cases where it would be impossible to employ an ordinary hard syringe and in all cases much pain to the patient will be avoided and a more effectual washing out or cleansing of the urethral passage can be effected. The soft perforated tube $d$ is detachable and may be changed for one of a different diameter.

What I claim as my invention and desire to secure by Letters Patent of the United States is:—

The improved urethral syringe consisting of a collapsible ball $a$, a tube $b$ provided with a non-return valve $c$, a soft tube $d$ formed in one piece and tapered to its extreme end which is closed and is provided with the outlet holes $e$ sloping rearwardly, all substantially as and for the purpose herein set forth.

In testimony whereof I have signed my name to this specification in the presence of two subscribing witnesses.

JAMES HENRY HOSEASON.

Witnesses:
 HENRY BERNOULLI BARLOW,
 HERBERT ROWLAND ABBEY.